US009325792B2

(12) United States Patent
Hallman et al.

(10) Patent No.: US 9,325,792 B2
(45) Date of Patent: Apr. 26, 2016

(54) AGGREGATION FRAMEWORK USING LOW-POWER ALERT SENSOR

(71) Applicant: Microsoft Corporation, Redmond, WA (US)

(72) Inventors: Kimberly Denise Auyang Hallman, Bellevue, WA (US); Desney Tan, Kirkland, WA (US); Ira Snyder, Bellevue, WA (US); Peter Glaskowsky, Carnation, WA (US); Mats Myrberg, Seattle, WA (US); Michael Hall, Snohomish, WA (US); Michael Koenig, Bellevue, WA (US); Andrew Wilson, Seattle, WA (US); Greg Shirakyan, Kirkland, WA (US); Matthew Dyor, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 189 days.

(21) Appl. No.: 13/671,370

(22) Filed: Nov. 7, 2012

(65) Prior Publication Data

US 2014/0129866 A1 May 8, 2014

(51) Int. Cl.
*G06F 1/00* (2006.01)
*H04L 29/08* (2006.01)
(Continued)

(52) U.S. Cl.
CPC . *H04L 67/12* (2013.01); *G06F 1/30* (2013.01); *G06F 1/32* (2013.01)

(58) Field of Classification Search
CPC ..................................... G06F 1/30; G06F 1/32
USPC ........................................................ 713/340
See application file for complete search history.

(56) References Cited

U.S. PATENT DOCUMENTS 5,971,597 A 10/1999 Baldwin et al.
6,796,187 B2 9/2004 Srinivasan et al.
(Continued)

FOREIGN PATENT DOCUMENTS

EP 1517493 A2 3/2005

OTHER PUBLICATIONS

"International Search Report & Written Opinion for PCT Patent Application No. PCT/US2013/069000", Mailed Date: Feb. 25, 2014, Filed Date: Nov. 7, 2013, 11 Pages.
(Continued)

*Primary Examiner* — Jaweed A Abbaszadeh
*Assistant Examiner* — Austin Hicks
(74) *Attorney, Agent, or Firm* — Steve Wight; Sandy Swain; Micky Minhas

(57) ABSTRACT

An aggregation framework system and method that automatic configures, aggregates, disaggregates, manages, and optimizes components of a consolidated system of devices, modules, and sensors. Embodiments of the system and method include a low-power alert sensor, a data aggregator module, and an interpreter module. The low-power alert sensor is a sensor that is continuously on and continuously monitoring its environment. The low-power alert sensor acts as a watchdog and triggers other sensors to awaken them from a power-conservation state when there is a change or event that occurs in an environment. The data aggregator module manages the set of sensors within the system and aggregates sensor data obtained from the sensors. The interpreter module then translates the physical data collected by sensors into logical information. Together the data aggregator module and the interpreter module present a unified logical view of the capabilities of the sensors under their control.

20 Claims, 7 Drawing Sheets

(51) Int. Cl.
*G06F 1/32* (2006.01)
*G06F 1/30* (2006.01)

(56) References Cited

U.S. PATENT DOCUMENTS

| | | | |
|---|---|---|---|
| 6,909,921 | B1 | 6/2005 | Bilger |
| 7,847,699 | B2 | 12/2010 | Lee et al. |
| 8,886,744 | B1* | 11/2014 | Pabla ............ 709/217 |
| 2003/0201929 | A1 | 10/2003 | Lutter et al. |
| 2004/0212677 | A1* | 10/2004 | Uebbing ............ 348/155 |
| 2006/0136759 | A1 | 6/2006 | Koo |
| 2007/0150565 | A1* | 6/2007 | Ayyagari et al. ........ 709/223 |
| 2009/0055691 | A1* | 2/2009 | Ouksel et al. ............ 714/48 |
| 2009/0319569 | A1 | 12/2009 | Parks |
| 2010/0039284 | A1* | 2/2010 | Hall et al. .......... 340/825.36 |
| 2010/0074157 | A1 | 3/2010 | Doh et al. |
| 2010/0182157 | A1 | 7/2010 | Shaffer |
| 2011/0068746 | A1 | 3/2011 | Rocci |
| 2011/0074596 | A1 | 3/2011 | Frohlick et al. |

OTHER PUBLICATIONS

Bai, et al., "Design and Implementation of a Home Embedded Surveillance System with Ultra-Low Alert Power", In IEEE Transactions on Consumer Electronics, vol. 57, Issue 1, Feb. 1, 2011, pp. 153-159.
Alaei, M., J. M. Barceló-Ordinas, Node clustering based on overlapping FoVs for wireless multimedia sensor networks, Proc. of the 2010 IEEE Wireless Communications and Networking Conf., WCNC 2010, Apr. 18-21, 2010, pp. 1-6, Sydney, Australia.
Analog Devices, Inc., ADUC7034: Integrated precision battery sensor for automotive, Data Sheet, May 2010, pp. 1-136, retrieved from http://www.analog.com/static/imported-files/data_sheets/ADuC7036.pdf.
Apple Computer, Inc., Nike + iPod: About the sensor battery, Apple Support, Jan. 20, 2010, pp. 1-2, retrieved from http://support.apple.com/kb/HT1400.
Argus Analyzers, Automotive battery monitoring system, pp. 1-2, retrieved May 14, 2012 from http://www.argusanalyzers.com/embedded-battery-sensors/automotive-sensors.html.
Boice, J., X. Lu, C. Margi, G. Stanek, G. Zhang, K. Obraczka, Meerkats: A power-aware, self-managing wireless camera network for wide area monitoring, Distributed Smart Cameras Workshop—SenSys06, Technical Report UCSC-CRL-05-04, Oct. 2006, pp. 1-13.
Brashear, H., T. Starner, P. Lukowicz, H. Junker, Using multiple sensors for mobile sign language recognition, Proc. of the Seventh IEEE Int'l Symposium on Wearable Computers, ISWC 2003, Oct. 21, 2003, pp. 45-52.
Delphi Corp., Delphi IVT Battery Sensor, Mar. 27, 2008, p. 1, retrieved from http://delphi.com/shared/pdf/ppd/sensors/et_ivt.pdf.
EE Times Asia, Smart battery sensor targets auto, industrial, medical batteries, May 15, 2012, pp. 1-2, retrieved from http://www.eetasia.com/ART_8800666960_765245_NP_7bdae7b1.HTM.
Hella Electronics Corp., Intelligent battery sensors, May 2007, pp. 1-2, retrieved from http://www.hella.nl/produktion/HellaNL/WebSite/MiscContent/Download/Automobilindustrie/Booklets_Flyer/ELO_lbs_Flyer.pdf.
Margi, C. B., V. Petkov, K. Obraczka, R. Manduchi, Characterizing energy consumption in a visual sensor network testbed, 2nd Int'l Conf. on Testbeds & Research Infrastructures for the DEvelopment of NeTworks & COMmunities, TRIDENTCOM 2006, Mar. 1-3, 2006, pp. 331-339, Barcelona, Spain.
Margi, C. B., R. Manduchi, K. Obraczka, Energy consumption tradeoffs in visual sensor networks, Proc. of 24th Brazilian Symposium on Comp. Networks, SBRC 2006, Jun. 2006, pp. 16, Curitiba, Brazil.
Shih, E., P. Bahl, M. J. Sinclair, Wake on wireless: An event driven energy saving strategy for battery operated devices, Proc. of the Eighth Annual Int'l Conf. on Mobile Computing and Networking, MOBICOM 2002, Sep. 23-26, 2002, pp. 160-171, Atlanta, Georgia, USA.
Wang, Y., J. Lin, M. Annavaram, Q. Jacobson, J. I. Hong, B. Krishnamachari, N. M. Sadeh, A framework of energy efficient mobile sensing for automatic user state recognition, Proc. of the 7th Int'l Conf. on Mobile Sys's, Mobile Sensing and Inference, MobiSys 2009, Jun. 22-25, 2009, pp. 179-192, Kraków, Poland.
Zhu, Y., Y. Liu, L. M. Ni, Z. Zhang, Low-power distributed event detection in wireless sensor networks, 26th IEEE Int'l Conf. on Comp. Comm., INFOCOM 2007, May 6-12, 2007, pp. 2401-2405, Anchorage, Alaska, USA.
Zilan, R., J. M. Barcelo-Ordinas, B. Tavli, Available mote platforms for wireless image sensors, Technical Report UPC-DAC-RR-XCSD-2008-4, Sep. 2008, pp. 24, retrieved from https://www.ac.upc.edu/app/research-reports/html/2008/9/Motes.pdf.

* cited by examiner

AGGREGATION FRAMEWORK USING LOW-POWER ALERT SENSOR

BACKGROUND

People currently use a variety of devices that are connected to the Internet, such as computers, sensors, phones, and actuators. Some estimates project the proliferation of over 50 billion such Internet-connected devices deployed by the year 2020. These devices are starting to pervade homes, workplaces, vehicles, and public spaces. They watch people, listen to people, and feel people. Moreover, they infer context and action, anticipate and mediate interactions between persons and their world, and in some cases allow people to be more effective humans.

Many of these devices and their associated technologies are developed independently of one another and use proprietary techniques. Each device is built without thought that the device may become part of a larger, collaborative system. These devices, for the most part, do not communicate with each other in a way that allows them to combine their capabilities with the capabilities of other devices. Moreover, these devices can be difficult to deploy and configure. This means that many of the multitudes of devices that are commonly used each day are unable to communicate and interact with each other. Many of these devices use stand-alone point-solutions of dumb sensing and actuation systems, each of which is specialized to do a very small set of isolated tasks. It is highly desirable for these devices to easily interoperate while at the same time being durable and power efficient.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the aggregation framework system and method automatically configure, aggregate, disaggregate, manage, and optimize components of a consolidated system of devices, modules, and sensors. Embodiments of the system and method use selective actuation to identify sensors and devices as they enter and exit from the system. The collective resources of the system are adjusted based on the capabilities of those sensors that are currently part of the system. Embodiments of the system and method can turn off sensors, devices, and modules that are not needed or not being used in order to save power.

Embodiments of the aggregation framework system and method manage a set of sensors. These sensors typically cover a defined local area. Embodiments of the system and method can be triggered into action by one or more low-power alert sensors and remote systems. Sensors may identify themselves to the data aggregator module by means of specific sensor characteristics such as functionality, calibration data, and power consumption.

Embodiments of the aggregation framework system and method include several components. In particular, the low-power alert sensor, the data aggregator module, the interpreter module, and the bridge. The interpreter module then translates the physical data collected by sensors into logical information. Together the data aggregator module and the interpreter module present a unified logical view of the capabilities of the sensors under its control to a remote system through a bridge. These elements are connected to the aggregation framework system over communication channels, such as a local network or the public Internet. Working together they transform dumb sensors into intelligent systems, rooms, and spaces. The bridge communicates with the remote system, or the "cloud". Embodiments of the aggregation framework system and method can be as simple as a low-power open source hardware single-board computer (such as a BeagleBoard) or as sophisticated as a PC or server.

A multitude of sensors are in broad deployment. In intelligent ambient spaces, or intelligent devices, there are already many sensors in use as special purpose parts performing such functions as sensing light, sound, pressure, vibration, spatial orientation, and so forth. However, sensors can be expensive to install and configure in meaningful ways. Assuming that this problem will be resolved as costs of sensors decrease, this means that an ever-increasing number of sensors will be used. With more sensors come more data and the challenge of how to manage these sensors and the data they generate. This challenge is made more difficult by the fact that sensors generally do not work cooperatively, need to be pre-programmed with respect to their function, and are not particularly intelligent about when to conserve power.

Embodiments of the aggregation framework system and method gather and disseminate data in a power efficient and cohesive manner, as compared to existing techniques. Special monitoring sensors operate as low-power alert sensors that are continuously (or always) on and continuously (or always) monitoring their environment. The low-power alert sensor triggers other sensor in the aggregation framework system. These other sensors stay suspended until needed and awakened by the low-power alert sensor. Typically the sensors that are suspended until awakened are specialized sensors that have a higher performance and higher power consumption as compared to other sensors in the system.

The data aggregator module manages the set of sensors within the system and coordinates every part of the sensing system. Instead of having numerous sensors communicating individually with a remote system, the data aggregator module and the interpreter module consolidate and convert sensor data into reports that are communicated to the cloud through the bridge. Together, these components create a collaborative sensing system that can conserve power.

In embodiments of the aggregation framework system and method, sensors in the sensor array are able to describe their inherent capabilities and to what events embodiments of the system and method can respond. As a sensor enters the system the low-power alert sensor detects this ingress and notifies and awakens the data aggregator module. Having been sufficiently alerted to the addition of a new sensor, the data aggregator module then interrogates or queries the sensor to ascertain its function and how it can be used to extend or enhance the existing system. Similarly, when a sensor exits the system the low-power alert sensor notifies the data aggregator module of this egress. The data aggregator module then adjusts the capabilities of the system accordingly.

The interpreter module interprets aggregated data and makes decisions to determine a course of action based on this aggregated data. Moreover, additional sensors can be awakened or powered up by the interpreter module to obtain additional data about the environment. If the sensors are placed in a power-conservation state by the interpreter module, they typically remain in that state until awakened by the low-power alert sensor. The interpreter module can also interpret the aggregated data to obtain a conceptual observation about what is occurring in the environment.

It should be noted that alternative embodiments are possible, and steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

In the following description of an aggregation framework system and method reference is made to the accompanying drawings, which form a part thereof, and in which is shown by way of illustration a specific example whereby embodiments of the a aggregation framework system and method may be practiced. It is to be understood that other embodiments may be utilized and structural changes may be made without departing from the scope of the claimed subject matter.

I. System Overview

Embodiments of the aggregation framework system and method aggregate data and devices to create a consolidated system that is able to detect changes and events occurring within an environment and, if desired or necessary, react to those changes and events. By way of example and not limitation, if embodiments of the system and method detect that, given a current course and speed, a child is about to fall down the stairs, the system and method can take immediate action to sound an alarm or activate a child safety gate.

Figure 1:
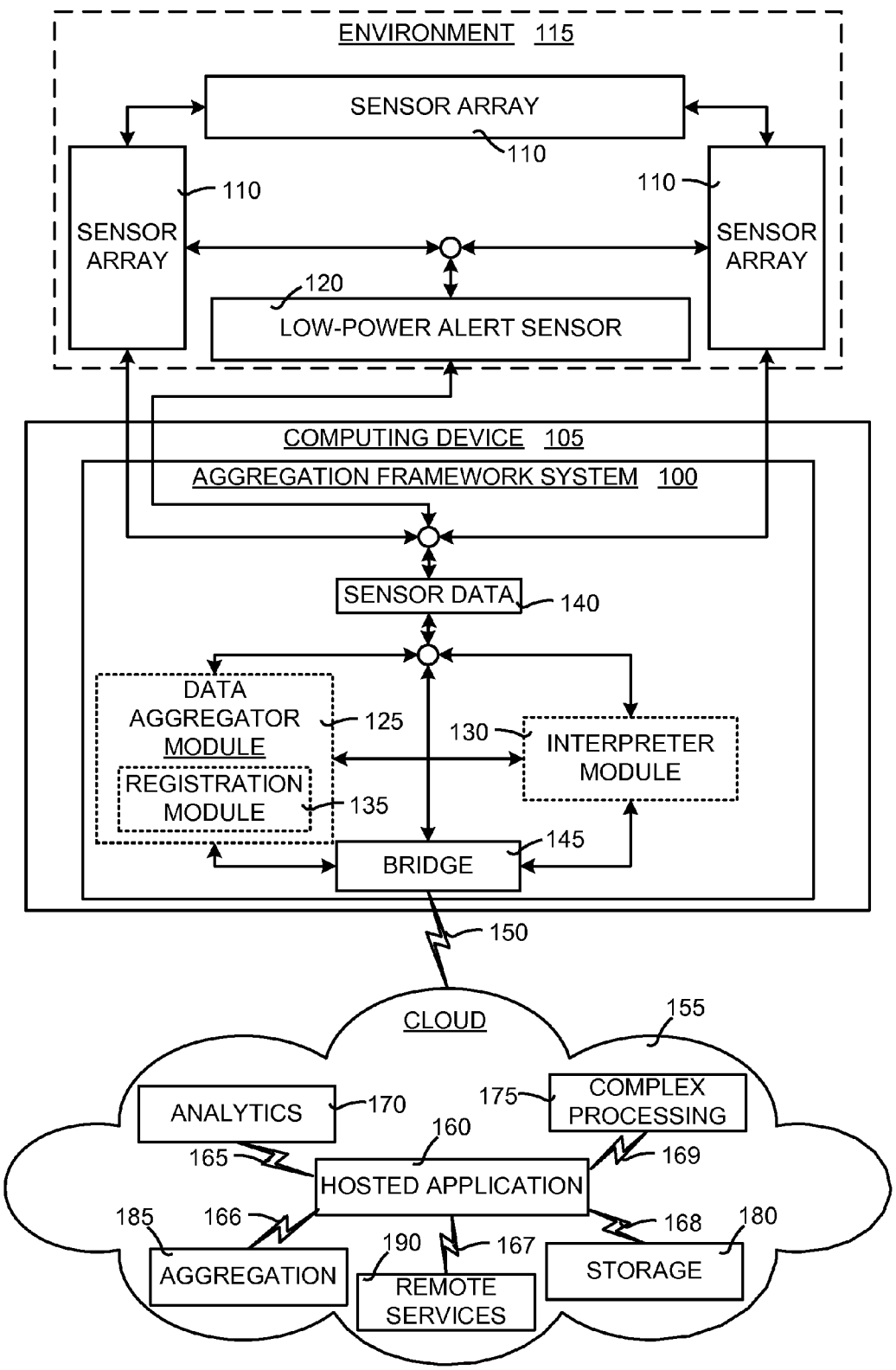
FIG. 1 is a block diagram illustrating a general overview of embodiments of the aggregation framework system and method implemented in a computing environment.

FIG. 1 is a block diagram illustrating a general overview of embodiments of the aggregation framework system 100 and method implemented in a computing environment. As shown in FIG. 1, embodiments of the system 100 and method are implemented on a computing device 105. This computing device may be a single computing device or may be spread out over a plurality of devices. Moreover, the computing device 105 may be virtually any device having a processor, including a desktop computer, a tablet computing device, and an embedded computing device.

Embodiments of the system 100 and method include a sensor array 110 that contains a plurality of sensors. This sensor array 110 may contain sensors that are the same type of sensor (such as a vibration sensor) or may be a combination of a variety of different types of sensors (such as thermal, audio, and vibration sensors). Collectively these sensors make up the sensor array 110. The sensor array 110 is positioned within an environment 115. This environment 115 may be, for example, a room, office, building, or city. As noted above embodiments of the system 100 and method scale well.

Embodiments of the system 100 and method also include a low-power alert sensor 120. This low-power alert sensor 120 is a sensor that acts as a "lookout" or "watchdog" for the entire system 100. In some embodiments the low-power alert sensor 120 is on duty constantly watching for changes or events occurring in the environment while the other sensors, devices, and system components within the system 100 are asleep or in a low-power or power-conservation state. Typically the low-power alert sensor consumes little power and is continuously connected and "on duty." Moreover, the low-power alert sensor 120 may be a single sensor or in other embodiments may be a plurality of sensors. When the low-power alert sensor 120 is a plurality of sensors the sensors may be of the same type or may be any combination of a variety of different types of sensors. The low-power alert sensor 120 may be implemented in several ways. One way is to have a typical (or power-hungry) sensor that is turned on occasionally by a low-power timer. The low-power timer would operate as the low-power alert sensor. Moreover, the term "low-power" also includes zero power. This includes situations where the low-power alert sensor 120 is passive or the energy is harvested from the signal itself. The low-power alert sensor 120 may be powered from different properties of the environment 115 including (but not limited to) electromagnetic fields, mechanical energy sources, acoustic energy sources, and so forth.

Embodiments the system 100 and method also include a data aggregator module 125 and an interpreter module 130. The data aggregator module 125 also includes a registration module 135. The data aggregator module 125, interpreter module 130, and registration module are shown in dotted lines to indicate that they are optional modules. This is explained in detail below.

The data aggregator module 125 coordinates the sensor array 110 and the low-power alert sensor 120 and any data received from these sensors. The registration module 135 oversees the registration and withdrawal of devices and sensors from the system 100. In addition, the data aggregator module 125 maintains a record of the capabilities of the system 100 given the current registration of sensors and devices with the system 100 their respective capabilities.

The sensor array 110 and the low-power alert sensor 120 communicate sensor data 140 to embodiments of the aggregation framework system 100. This sensor data 140 can be directed to a variety of different modules and devices. In some embodiments, the sensor data 140 is directed to the data aggregator module 125 where the sensor data 140 is aggregated to generate aggregated data (not shown). The data aggregator module 125 then passes the aggregated data on to the interpreter module 130 for higher-level processing.

In particular, the interpreter module 130 can interpret the aggregated data and make decisions or determine a course of action based on this aggregated data. Moreover, either the data aggregator module 125, the interpreter module 130, or both can determine that a course of action is to awaken or power up additional sensors in the sensor array 110 to obtain additional data about the environment 115. In some embodiments, the course of action may be to place some or all of the sensors in the sensor array 110 in a power-conservation state. They would remain in this state until awakened by the low-power alert sensor 120. The interpreter module 130 can also interpret the aggregated data to obtain a conceptual observation about what is occurring in the environment. For example, the data may indicate that there is movement in a room and include an identification number of an employee. The interpreter module 130 then would interpret this aggregated data to conclude that a specific employee has entered the room.

Embodiments of the system 100 and method may include any combination of the data aggregator module 125, interpreter module 130, and registration module 135. In other words, some embodiments include all three of these modules while some other embodiments include only two, one, or even none of these modules. In still other embodiments the low-power alert sensor 120 can communicate directly with the sensor array 110.

Embodiments of the system 100 and method also send and receive information and data from remote systems, sensors, and devices. This is done through a bridge 145 that is in communication with the data aggregator module 125, interpreter module 130, and the low-power alert sensor 120. Specifically, a network connection 150 connects embodiments of the system 100 with a cloud 155 computing environment. The cloud 155 includes a hosted application 160 that can access various services and components through various cloud connections 165, 166, 167, 168, 169. These services include analytics 170, complex processing 175, storage 180, aggregation 185, and other remote services 190.

II. Exemplary Operating Environment

Before proceeding further with the operational overview and details of embodiments of the aggregation framework system 100 and method, a discussion will now be presented of an exemplary operating environment in which embodiments of the aggregation framework system 100 and method may operate. Embodiments of the aggregation framework system 100 and method described herein are operational within numerous types of general purpose or special purpose computing system environments or configurations.

Figure 2:
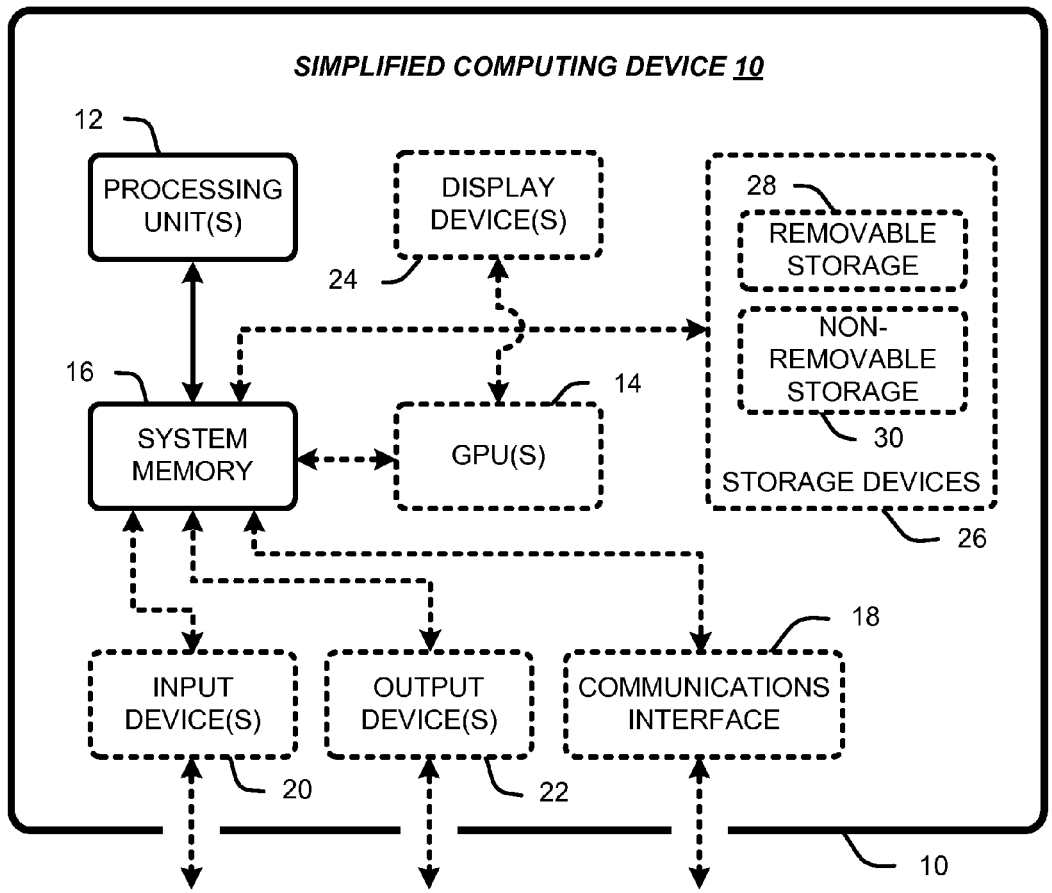
FIG. 2 illustrates a simplified example of a general-purpose computer system on which various embodiments and elements of the aggregation framework system and method, as described herein and shown in FIGS. 1 and 3-5, may be implemented.

FIG. 2 illustrates a simplified example of a general-purpose computer system on which various embodiments and elements of the aggregation framework system 100 and method, as described herein and shown in FIGS. 1 and 3-5, may be implemented. It should be noted that any boxes that are represented by broken or dashed lines in FIG. 2 represent alternate embodiments of the simplified computing device, and that any or all of these alternate embodiments, as described below, may be used in combination with other alternate embodiments that are described throughout this document.

For example, FIG. 2 shows a general system diagram showing a simplified computing device 10. The simplified computing device 10 may be a simplified version of the computing device 105 shown in FIG. 1. Such computing devices can typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, mini-computers, mainframe computers, audio or video media players, etc.

To allow a device to implement embodiments of the aggregation framework system 100 and method described herein, the device should have a sufficient computational capability and system memory to enable basic computational operations. In particular, as illustrated by FIG. 2, the computational capability is generally illustrated by one or more processing unit(s) 12, and may also include one or more GPUs 14, either or both in communication with system memory 16. Note that the processing unit(s) 12 of the general computing device may be specialized microprocessors, such as a DSP, a VLIW, or other micro-controller, or can be conventional CPUs having one or more processing cores, including specialized GPU-based cores in a multi-core CPU.

In addition, the simplified computing device 10 of FIG. 2 may also include other components, such as, for example, a communications interface 18. The simplified computing device 10 of FIG. 6 may also include one or more conventional computer input devices 20 (such as styli, pointing devices, keyboards, audio input devices, video input devices, haptic input devices, devices for receiving wired or wireless data transmissions, etc.). The simplified computing device 10 of FIG. 2 may also include other optional components, such as, for example, one or more conventional computer output devices 22 (e.g., display device(s) 24, audio output devices, video output devices, devices for transmitting wired or wireless data transmissions, etc.). Note that typical communications interfaces 18, input devices 20, output devices 22, and storage devices 26 for general-purpose computers are well known to those skilled in the art, and will not be described in detail herein.

The simplified computing device 10 of FIG. 2 may also include a variety of computer readable media. Computer readable media can be any available media that can be accessed by the simplified computing device 10 via storage devices 26 and includes both volatile and nonvolatile media that is either removable 28 and/or non-removable 30, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the aggregation framework system 100 and method described herein, or portions thereof, may be stored, received, transmitted, or read from any desired combination of computer or machine readable media or storage devices and communication media in the form of computer executable instructions or other data structures.

Finally, embodiments of the aggregation framework system 100 and method described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

III. Operational Overview

Figure 3:
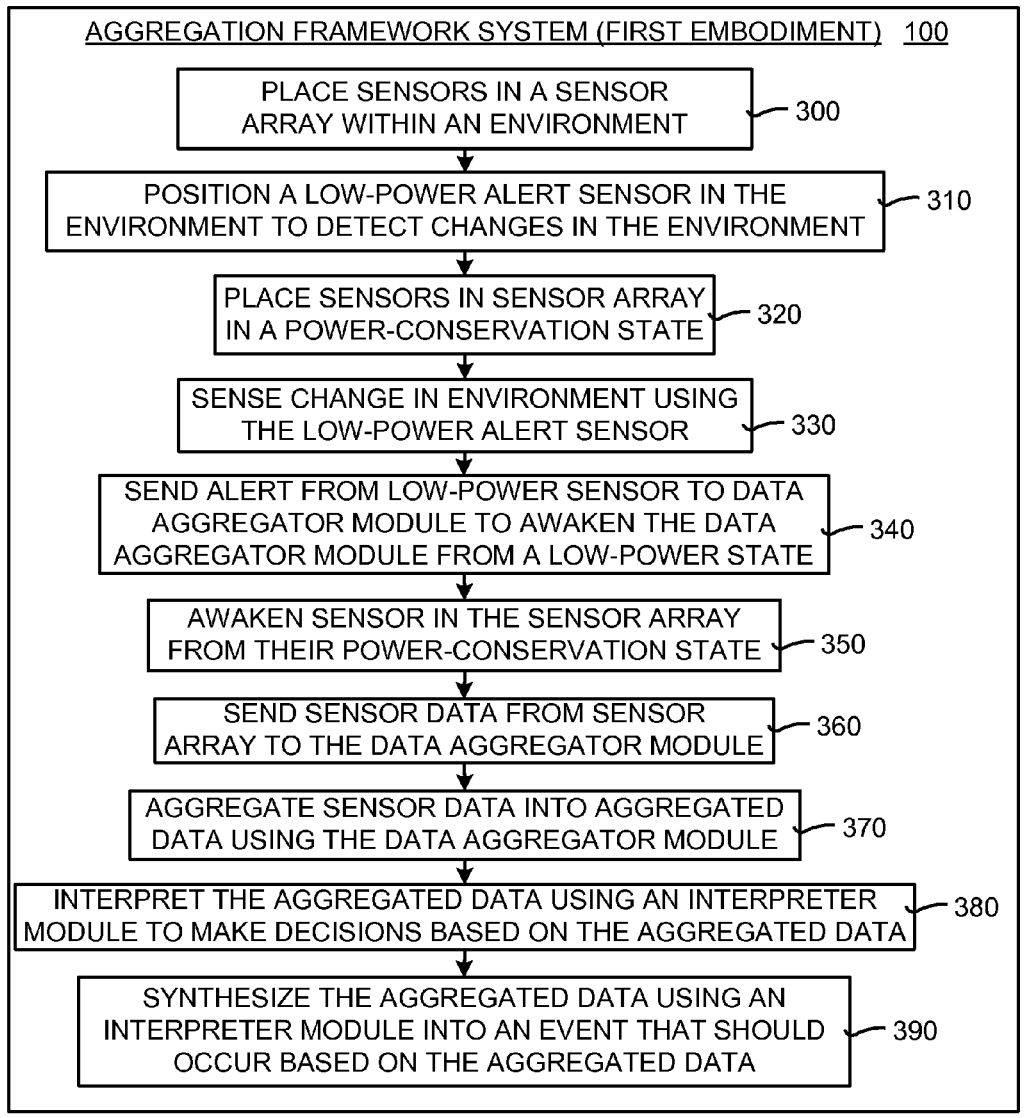
FIG. 3 is a flow diagram illustrating the general operation of a first embodiment of the aggregation framework system shown in FIG. 1.

FIG. 3 is a flow diagram illustrating the general operation of a first embodiment of the aggregation framework system 100 shown in FIG. 1. As shown in FIG. 3, the operation of the system 100 begins by placing sensors that are part of a sensor array 110 within an environment 115 (box 300). As noted above, the environment 115 may be virtually any type of area or volume where properties can be sensed, such as a room, building, or city. Next, the method includes positioning a low-power alert sensor 120 in the environment 115 (box 310). The low-power alert sensor 120 is used to detect changes or events occurring within the environment 115. As also noted above, the low-power alert sensor 120 may include a single sensor or a plurality of sensors.

The sensors in the sensor array 110 are placed in a power-conservation state (box 320). This power-conservation state is a state that allows the sensors to use as little energy as possible while still being able to come back online or awaken quickly if needed. In addition, devices and modules that are part of the system 100 may be placed in a power-conservation state or low-power state. This includes the data aggregator module 125, the interpreter module 130, and the registration module 135.

In this configuration each of the sensors in the sensor array 110 and other devices and modules in the system 100 are in a power-conservation state (or "asleep"). However, the low-power alert sensor is fully operational and awake and waiting to detect a change or an event in the environment 115. Once a change in the environment 115 is detected by the low-power alert sensor 120 (box 330), then an alert is sent from the low-power alert sensor 120 to the data aggregator module 125 (box 340). This alert awakens the data aggregator module 125 from its low-power state.

In some embodiments the data aggregator module 125 awakens other sensors in the sensor array 110 from their power-conservation state (box 350). In other embodiments the low-power alert sensor 120 directly awakens the sensors in the sensor array 110 and bypasses the data aggregator module 125. Once the sensor array 110 is fully operational it sends its sensor data 140 to the data aggregator module 125 (box 360).

In some embodiment the data aggregator module 125 is used to aggregate the sensor data 140 into aggregated data (box 370). This aggregation means that data from the operational sensors and any other information from sensors or devices in communication with the system 100 are combined into an aggregated data. In some embodiments the interpreter module 130 is used to interpret the aggregated data (box 380). Based on these interpretations the interpreter module 130 makes decisions based on the aggregated data. These decisions include which events are desirable to occur in the future, conceptual observations that can be rationally concluded from the aggregated data, and a course of action that may be followed. In particular, in some embodiments the method includes synthesizing the aggregated data into an event that is desirable to occur based on the aggregated data (box 390).

Figure 4:
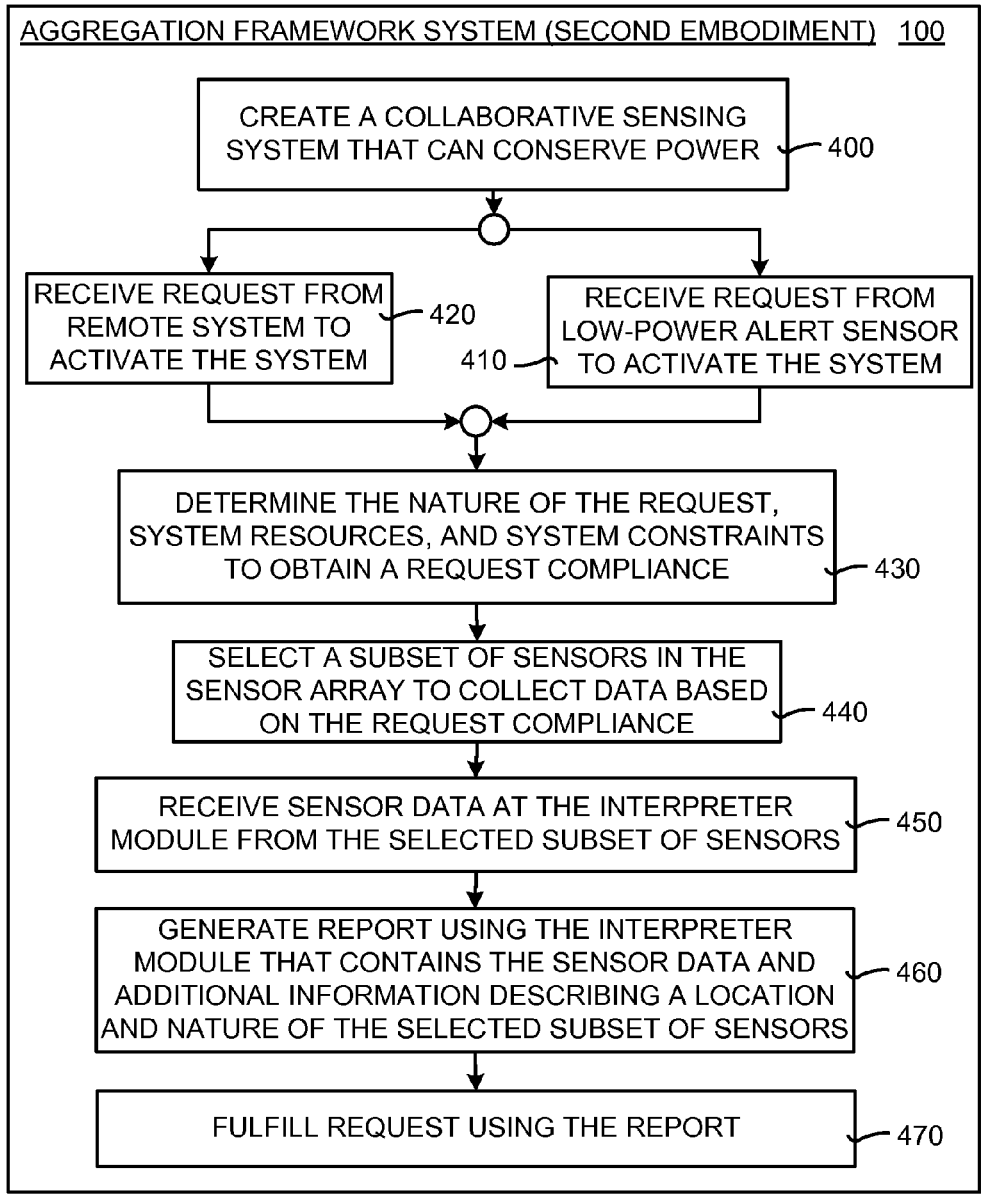
FIG. 4 is a flow diagram illustrating the general operation of a second embodiment of the aggregation framework system shown in FIG. 1.

FIG. 4 is a flow diagram illustrating the general operation of a second embodiment of the aggregation framework system 100 shown in FIG. 1. As shown in FIG. 4, a collaborative sensing system is created for the purpose of providing sensing ability while conserving power (box 400). This collaborative sensing system includes the sensor array 110. The collaborative sensing system has sensors, devices, and modules that are not being used in a power-conservation state in order to conserve energy.

Alerts to awaken from a power-conservation state may be received from a plurality of sources. In one embodiment the request is received from the low-power alert sensor (box 410). This alert activates, awakens, or otherwise powers up the system 100. In other embodiments the request is received from a remote system to activate the system 100. (box 420).

Embodiments of the aggregation framework system 100 then determine the nature of the request (box 430). In addition to the request, system resources and system constraints are taken into account in order to obtain a request compliance. This request compliance is used to try and comply with the request. One way in which this can be accomplished is by selecting a subset of sensors in the sensor array 110 to collect data based on the request compliance (box 440). In other words, sensors are activated by the system 100 in order to obtain the data or information that is being requested.

Sensor data from the selected subset of sensors is received at the interpreter module 130 (box 450). This data is interpreted and organized by the interpreter module 130 in order to comply with the request. The interpreter module 130 then generates a report that contains the sensor data and any additional information to fulfill the request (box 460). This report then is used to fulfill the request (box 470).

IV. Operational Details

The operational details of embodiments of the aggregation framework system 100 and method will now be discussed. Embodiments of the aggregation framework system and method is the overall architecture of how the sensors in the sensor array register with the system, report their data, aggregate the data, and then how that aggregated data is synthesized into an event that is desirable to occur based on the sensor data. Embodiments of the system 100 and method include three main components. Namely, the low-power alert sensor 120, the data aggregator module 125, and the interpreter module 130. Each of these components (including the registration module 135) will be discussed in detail below. Moreover, various other operational details of the system 100 and method will be discussed.

IV.A. Low-Power Alert Sensor

The low-power alert sensor 120 is a sensor that is awake and acts as a lookout while other devices and sensors can be placed in a power-conservation state or mode. The low-power alert sensor 120 is continuously on, continuously connected, continuously sensing, and continuously monitoring its environment 115. It runs in a low-power state and allows higher-function devices and sensors to be powered down or placed in a sleep state, where they are ready to come back online quickly.

The low-power alert sensor 120 is a control concept that activates and deactivates functionality within embodiments of the aggregation framework system 100 and method. In its most basic sense, a low-power alert sensor 120 can be anything that senses a physical phenomenon (or derived event) then it actuates and awakens other devices in response.

The low-power alert sensor 120 can be virtually any type sensor. This includes sensors that sense properties of the environment 115 such as vibration, light, movement, audio, thermal, and so on. The low-power alert sensor 120 is designed to detect changes in the environment 115. Moreover, in some embodiments the low-power alert sensor 120 contains multiple sensors.

The low-power alert sensor 120 as well as sensors in the sensor array 110 can include "lick-n-stick" sensors. The lick-n-stick sensors are sensors that are inexpensive and easy to deploy, thereby requiring minimal effort and labor. Currently these lick-n-stick sensors are deployed for non-critical applications, such as corrosion monitoring, steam traps, heat tracing, safety showers and pump vibrations.

In order to conserve power, embodiments of the aggregation framework system 100 and method turn off (or place in a power-conservation state) sensors and components that are not currently being used. However, the low-power alert sensor 120 remains on. This low-power alert sensor 120 is a low-power device that can make a determination that an "event" has occurred or a change of condition exists. The low-power alert sensor 120 then "wakes up" other sensors, the data aggregator module 125, or both. In other words it alerts the rest of the system 100. This "wake up" includes directly powering up the devices and at times bypassing the data aggregator module 125. This bypass of the data aggregator module enables a faster response time. Faster response times are desirable, for example, in the case of alarms.

In some embodiments of the aggregation framework system 100 the low-power alert sensor 120 is programmable. Programmable means that a user, embodiments of the aggregation framework system 100, or both designate what the low-power alert sensor 120 should sense as acceptable parameters. The low-power alert sensor 120 typically contains a microcontroller. In this way embodiments of the aggregation framework system 100 provide a program for a low-power alert sensor 120 to execute commands. For example, if the low-power alert sensor 120 detects that a door has been opened, then when the door is opened embodiments of the system 100 cause the lights to turn on and a projector to be powered up. This is because a program in embodiments of the system 100 has been written to cause these commands to be executed upon occurrence of a particular event or change in environment 115.

With the low-power alert sensor 120 on watch the remainder of embodiments of the aggregation framework system 100 and any remaining sensors in the system 100 and method can be placed into a low-power state. This conserves a substantial amount of power and prolongs the life of the rest of the embodiments of the system 100 and method while simultaneously being instantly responsive and helpful.

When a new device or sensor is added to embodiments of the aggregation framework system 100 the low-power alert sensor 120 can communicated with this new sensor and instruct it to register with embodiments of the system. As this is being done the low-power alert sensor 120 would also simultaneously bring the data aggregator module 125 out of a sleep state.

IV.B. Data Aggregator Module

The data aggregator module 125 controls, manages, and collects data from sensors in the sensor array 110. The data aggregator module 125 controls these sensors as logical devices. The data aggregator module 125 also passes the sensor data 140 collected from the sensor array 110 onto a logical layer (such as the interpreter module 130). An application programming interface (API) allows the data aggregator module 125 to collect the sensor data 140 from a spectrum of different sensor types. In this manner the data aggregator module 125 manages the producer/consumer relationship for sensors.

Figure 5:
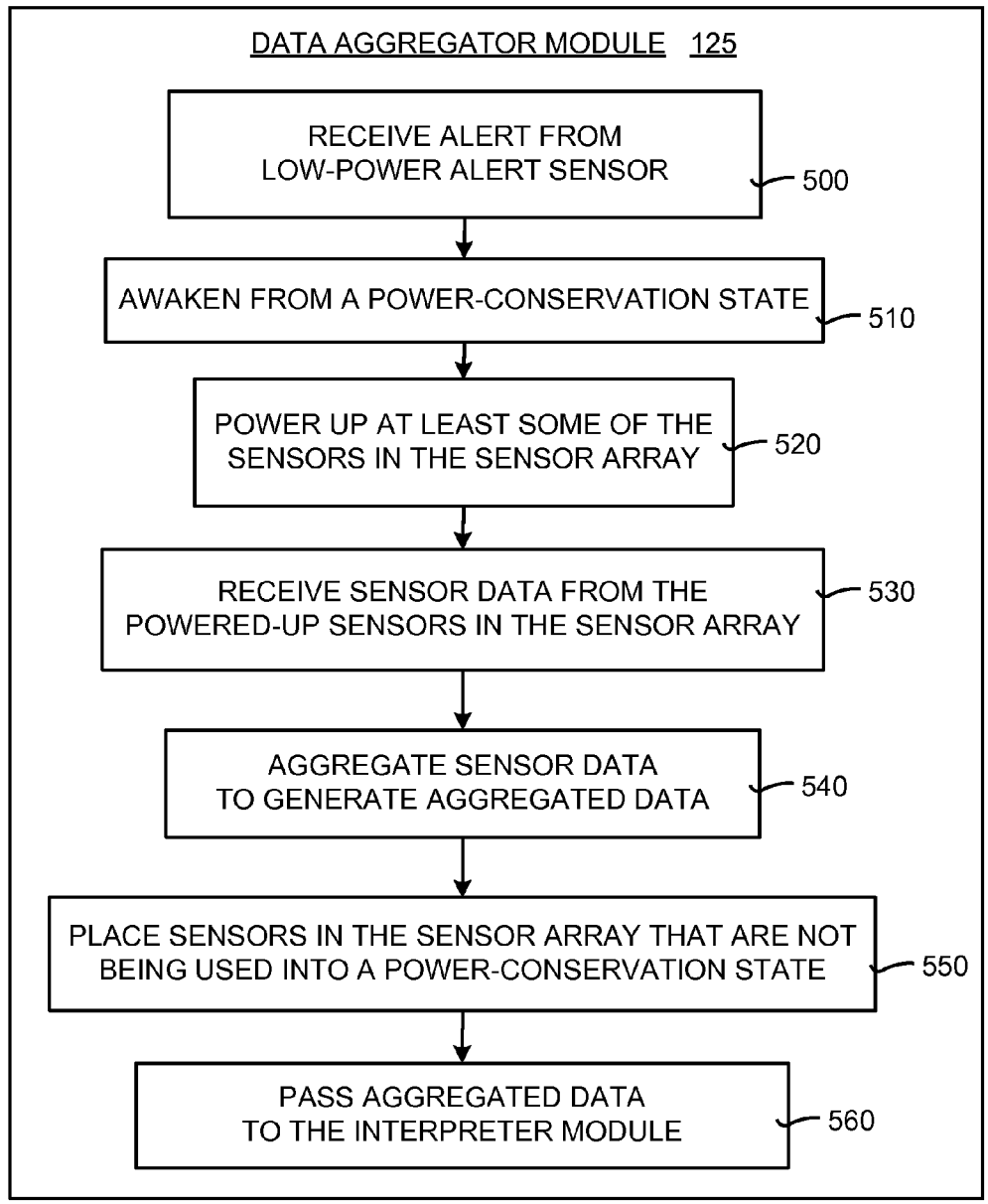
FIG. 5 is a flow diagram illustrating details of the operation of an exemplary embodiment of the data aggregator module shown in FIG. 1.

FIG. 5 is a flow diagram illustrating details of the operation of an exemplary embodiment of the data aggregator module 125 shown in FIG. 1. The operation of the module 125 begins by receiving an alert from the low-power alert sensor 120 (box 500). This alert awakens the data aggregator module 125 from its power-conservation state (box 510). The data aggregator module 125 then powers up at least some of the sensors in the sensor array 110 (box 520).

The data aggregator module 125 then receives sensor data 140 from the powered-up sensors in the sensor array 110 (box 530). This received sensor data 140 is aggregated to generate aggregated data (box 540). Any sensors in the sensor array 110 that are not being used are placed into a power-conservation state (box 550). This helps conserve power while still ensuring that any changes or events occurring in the environment 115 will be detected and reported by the low-power alert sensor 120. The aggregated data is passed onto the interpreter module 130 (box 560).

IV.C. Registration Module

The registration module 135 is part of the data aggregator module 125 and is used to register the incoming and outgoing sensors and devices to the system 100. When a device or sensor enters or exits the system 100, there is a published API that is used to register or de-register these devices and sensors with the system 100. This registration and de-registration is achieved without human interaction. By combining and consolidating devices and sensors into a unified system 100—, the overall system 100 becomes more intelligent. This registration process also allows "dumb" devices to become smarter by consolidating their capabilities with the resources and capabilities of the system 100.

Figure 6:
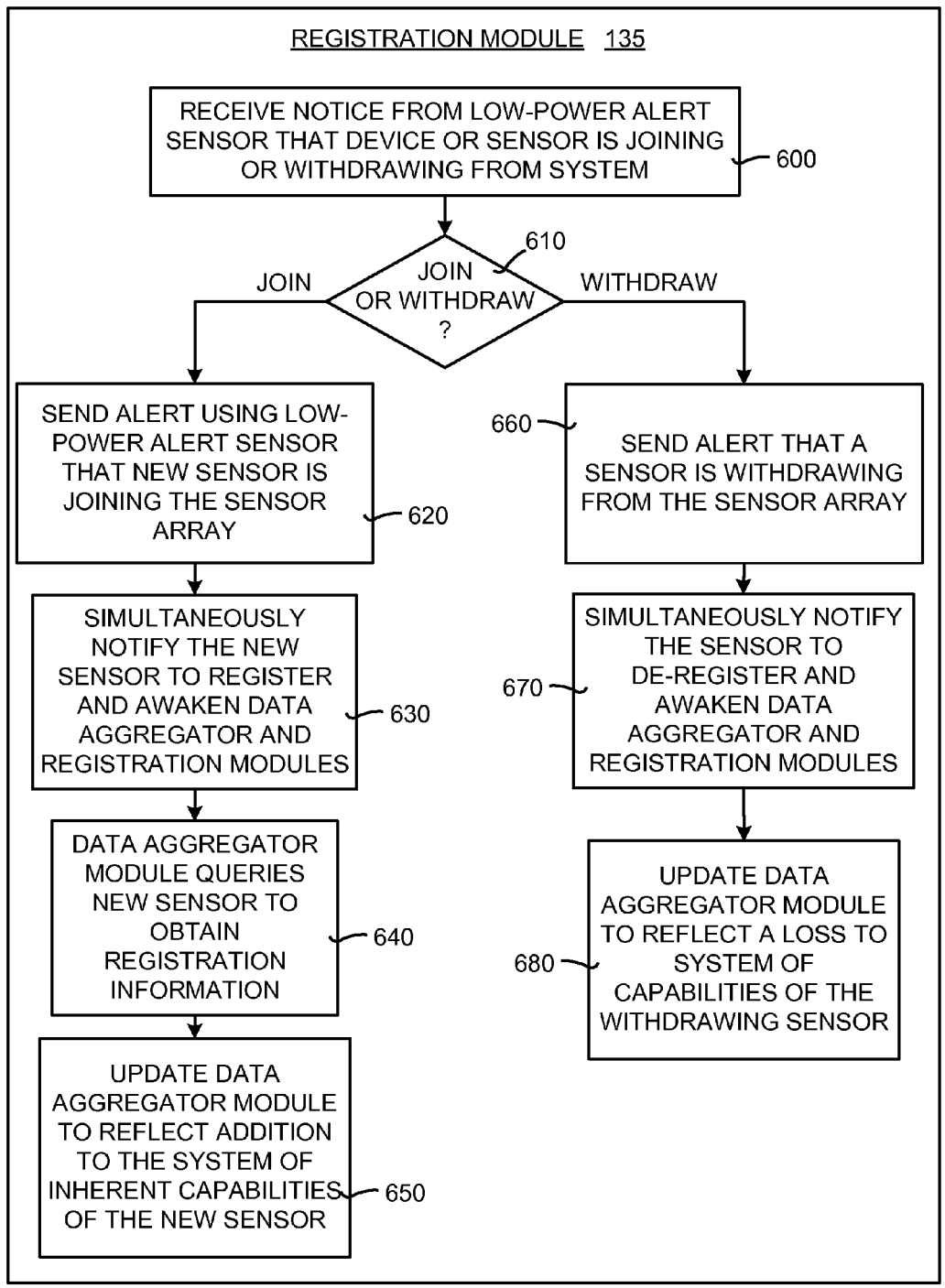
FIG. 6 is a flow diagram illustrating details of the operation of an exemplary embodiment of the registration module shown in FIG. 1.

FIG. 6 is a flow diagram illustrating details of the operation of an exemplary embodiment of the registration module shown in FIG. 1. The operation begins by receiving notice from the low-power alert sensor that a device or sensor is joining or withdrawing from the system 100 (box 600). A determination then is made as to whether the device or sensor is joining or withdrawing from the system 100 (box 610).

If a device or sensor is joining the system 100, then an alert is sent from the low-power alert sensor 120 that the new sensor is joining the sensor array 110 (box 620). Simultaneously the new sensor is asked to register with the registration module 135 and the data aggregator module 125 and registration module 135 are awakened. It should be noted that awakening of any of the sensors, devices, or components of the system 100 can be instantaneous.

The data aggregator module 125 can also query the new sensor to obtain registration information (box 640). This can be done either through an operating system in the data aggregator module 125 or the published API. The new sensor provides the registration information that includes specific sensor characteristics such as functionality, calibration data, and power consumption. Once the new sensor communicates this registration information and their capabilities to the registration module 135 then control of this new sensor is taken over by the data aggregator module 125. The data aggregator module 125 is updated with the capabilities of the new sensor (box 650). This update reflects the addition to the system 100 of the inherent capabilities of the new sensor.

If a sensor is withdrawing from the system 100, then an alert is sent from the low-power alert sensor 120 that the sensor is withdrawing from the sensor array 110 (box 660). Simultaneously, the sensor is notified to de-register with the registration module 135 and the data aggregator module 125 and registration modules 135 are awakened (box 670). The data aggregator module 125 is updated to reflect the loss to the system 100 of the capabilities of the withdrawing sensor (box 680).

IV.D. Communication with Sensors and Devices

In some embodiments the low-power alert sensor 120 communicates with the data aggregator module 125. In other embodiments, however, the low-power alert sensor 120 communicates with other peers. Moreover, in still other embodiments two or more peers communicate directly with each other. In general, a peer is any type of sensor or device that is in registered with the system 100. By way of example, a phone could be a peer having multiple sensors and can communicate with other peer like a personal computer (PC). Or, the PC could communicate with a projector that is a peer. It should also be noted that peers do not have to be the same type of sensors or devices. Communication between peers is achieved using standard protocols that are well known to those having ordinary skill in the communication arts. Moreover, various permissions and access to various devices can be granted based on identification and the need to know.

By way of example and not limitation, in one case assume that a person is carrying an employee badge. When the person walks in to a room, where the room is part of the environment 115 of the system 100, then the system 100 knows an identity of that person because of the employee badge that he/she is carrying. The PC in the room can then register with the data aggregator module 125 and send sensor data stating that the employee is in the room. Moreover, the data aggregator module 125 can access the employee's calendar and note that according to his/her calendar the employee is giving a presentation at 3 pm. Moreover, the system 100 knows which conference room in which the meeting is scheduled. The system 100 then turns on the projector in the scheduled conference room and the projector is turned on. The system then causes the PC to bring up the presentation and automatically projects it through the projector.

In another example, students walk into their classroom and their phones are registered with the registration module 135. The system 100 can silence each of the students' phones or send course or lecture data to the phone or student's tablet. Moreover, the system 100 can synchronize a copy of the presentation being given in the classroom and send the presentation to these other devices in the presentation room.

IV.E. Interpreter Module

The interpreter module 130 converts the sensor data 140 into conceptual observations. This is commonly called "sensor fusion." A sensor array 110 in communication with the interpreter module 130 can detect a single event that is physical or derived. For example, assume the sensor array 110 detects a person walking across a threshold of a doorway. The interpreter module 130 would convert this information received from the sensor array 110 into a conceptual observation. In this case, the data from the sensor array 110 would provide information that a specific individual has walked in an office. The action because of this interpreted event could be any number of actions. For example, in this case the interpreter module 130 would communicate with a light switch as the logical layer and turn on the lights when the specific individual entered the office. The lights would remain on until embodiments of the system 100 determine that the last person has left the room.

Figure 7:
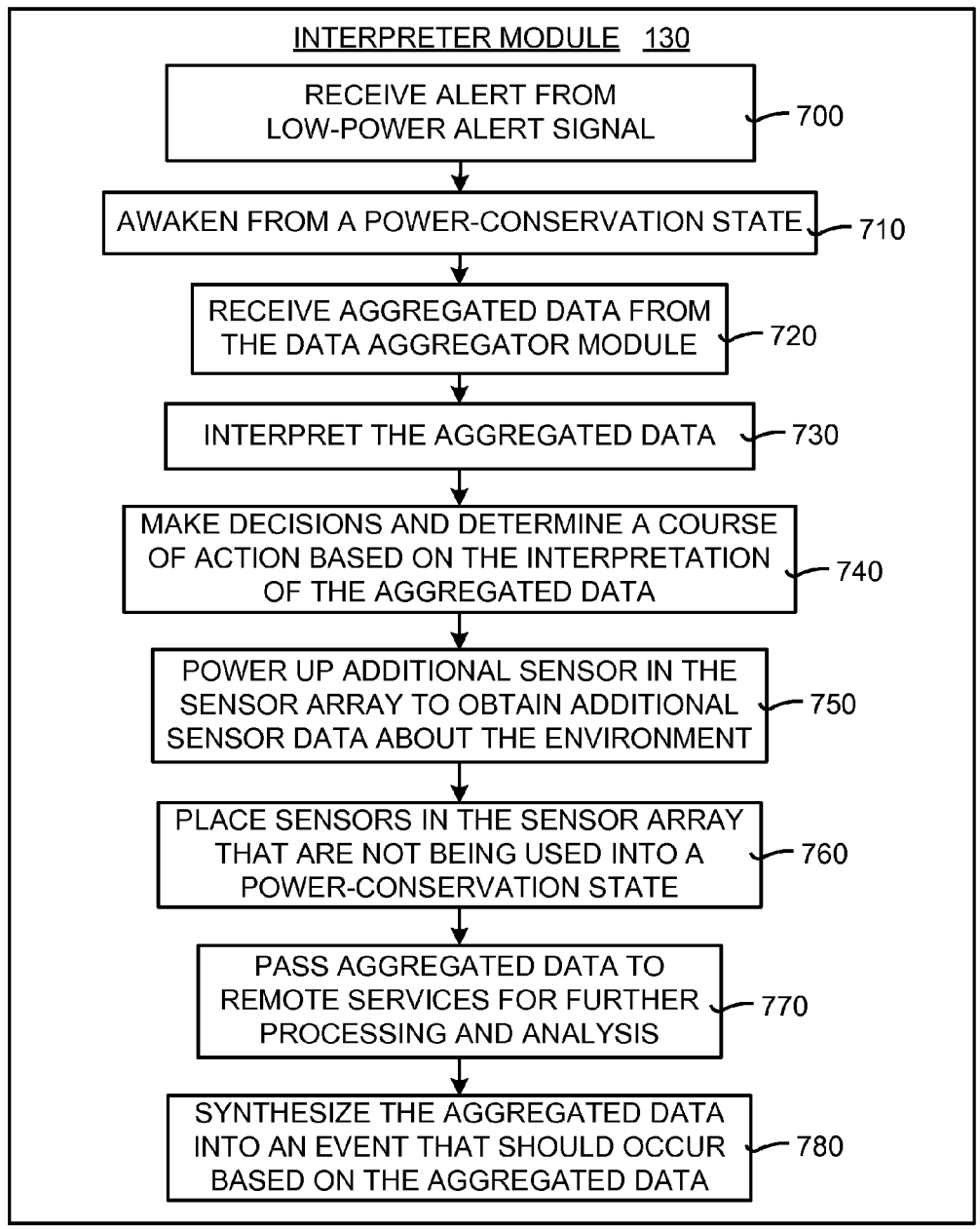
FIG. 7 is a flow diagram illustrating details of the operation of an exemplary embodiment of the interpreter module shown in FIG. 1.

FIG. 7 is a flow diagram illustrating details of the operation of an exemplary embodiment of the interpreter module shown in FIG. 1. The operation of the interpreter module 130 begins by receiving an alert from the low-power alert sensor 120 (box 700). The alert causes the interpreter module 130 to awaken from a power-conservation state (box 710). The interpreter module 130 then can receive the aggregated data from the data aggregator module 125 (box 720). This aggregated data is interpreted by the interpreter module 130 (box 730).

This interpretation includes making decisions and determining a course of action to take based on the aggregated data (box 740). In some embodiments, the course of action includes powering up additional sensors in the sensor array 110 to obtain additional sensor data 140 about the environment 115 (box 750). Moreover, in some embodiments this course of action includes placing sensors in the sensor array 110 that are not being used into a power-conservation state (box 760).

The aggregated data can also be passed to a remote system or remote services 190 in the cloud 155 for further processing and analysis (box 770). Any results can be sent back to the system 100 to allow the system 100 to take action based on the analysis. In addition, the interpreter module 130 can synthesize the aggregated data into an event that should occur based on the analysis of the aggregated data by either the remote services 190, the interpreter module 130, or both.

IV.F. Bridge

The bridge 145 connects the logical subsystem to a network connection 150, such as an intranet or the Internet. In general terms, the bridge 145 is a bus and transfers data between computers or components within a computer. In some embodiments the bridge 145 connects the underlying components of embodiments of the aggregation framework system 100 and method to some other network for storage or higher-level reasoning.

Moreover, the bridge 145 allows components of the system 100 to control the sensor array 110 and collect more sensor data 140 as needed. For example, the low-power alert sensor 120, the data aggregator module 125, and the interpreter module 130 all can use the bridge 145 to communicate with the sensor array 110 and remote systems. For example, the data aggregator module 125 or interpreter module 130 can use the bridge 145 to access a person's calendar and act accordingly. Using the bridge 145 these modules can query devices directly that may contain the person's calendar or other desired information.

IV.G. Cloud and Remote Services

The cloud 155 receives information from the system 100 through the bridge 145. The cloud 155 participates via the hosted application 160. It performs appropriate analytics 170, aggregation 185, complex processing 175, storage 180, and so forth. It should be noted the cloud 155 may be either a public or private cloud.

Embodiments of the aggregation framework system 100 and method may respond to a request from the remote system. This request activates embodiments of the system 100 to enable a select subset of its sensors to collect data and then to generate a report using logic from the interpreter module 130. The subset of sensors selected by embodiments of the system 100 is based on the nature of the request, the characteristics of the sensors present, and other factors such as the amount of power or energy available to comply with the request. The generated report would contain the sensor data 140 and additional information describing the nature and location of the sensors.

These requests made by the remote system may range from simple requests to more complex requests. For example, a request may be simple, such as requesting a report as to whether a sensor is sensing a vibration. The request may ask embodiments of the aggregation framework system 100 and method to specify a confidence level, such as report whether there is a 30% confidence that a person has crossed a threshold. Or, the request include a more complex programmed determination, such as requesting a report as to whether there is a 50% chance that some higher level of assistance is needed, such as if a toddler is about to walk out the front door of a house.

The data aggregator module 125 and the interpreter module 130 may also work together to receive and process information from each controlled sensor to make higher-level determinations. For example, a remote system may request the position, course, and speed of an object that can be observed by sensors managed by embodiments of the system 100 and method. In response to this request, the data aggregator module 125 may activate a magnetic sensor, an accelerometer, and a gyroscope, gather the data from these sensors and then provide it to the interpreter module 130. The interpreter module 130 then computes position, course, and speed information and provides this information to the bridge 145, which reports it back to the remote system.

The low-power alert sensor may activate the rest of the system 100 via some signal. In this case the signal from the low-power alert sensor 120 is treated as a predefined request for further sensing and reporting. Embodiments of the aggregation framework system 100 then determine actions to take based on the sensor data 140 received from the low-power alert sensor 120, the characteristics of other sensors within the control of embodiments of the system 100 and method, and other factors (such as the amount of power or energy available). For example, an image sensor may be configured as a low-power alert sensor 120 so that if the image sensor detects a moving object it will directly wake up a magnetic sensor, an accelerometer, and a gyroscope, then activate embodiments of the system 100 to gather the data from these sensors, compute the requested position, course, and speed information, and transmit this information to a remote system via the bridge 145.

Moreover, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for aggregating data, comprising:
   receiving an alert from a low-power alert sensor, the alert specifies that an incoming sensor is detected by the low-power alert sensor to be joining a sensor array, wherein sensors in the sensor array comprise a plurality of different types of sensors;
   responsive to the alert from the low-power alert sensor, updating a record of capabilities of the sensors in the sensor array, the record of the capabilities of the sensors in the sensor array updated to reflect an addition of capabilities of the incoming sensor, the capabilities of the incoming sensor being described by the incoming sensor and specifying a sensing function performed by the incoming sensor;
   detecting a change in an environment based upon an output from the low-power alert sensor, the change detected while the sensors in the sensor array in the environment are in a power-conservation state;
   selecting a sensor in the sensor array to awaken from the power-conservation state based on:
      the change in the environment detected by the low-power alert sensor; and
      the record of the capabilities of the sensors in the sensor array;
   responsive to selecting the sensor, awakening the sensor in the sensor array;
   receiving sensor data about the environment from the sensor in the sensor array woken from the power-conservation state; and
   aggregating the sensor data into aggregated data.

2. The method of claim 1, further comprising:
   interpreting the aggregated data;
   determining a course of action based on an interpretation of the aggregated data; and
   implementing the course of action.

3. The method of claim 2, the course of action comprising awakening an additional sensor in the sensor array from the power-conservation state to obtain additional sensor data about the environment.

4. The method of claim 2, the course of action comprising causing the sensor in the sensor array woken from the power-conservation state to transition back into the power-conservation state based on the sensor not being used.

5. The method of claim 1, further comprising:
   transmitting a report comprising the aggregated data to a remote service.

6. The method of claim 2, further comprising:
   receiving additional data from a remote service; and
   interpreting the additional data from the remote service along with the aggregated data to determine the course of action.

7. The method of claim 2, further comprising synthesizing the aggregated data into an event that would be desirable to occur based on the interpretation of the aggregated data.

8. The method claim 1, the low-power alert sensor being continuously on, continuously connected, and continuously monitoring the environment for changes thereby allowing the sensors in the sensor array to be placed in the power-conservation state.

9. The method of claim 1, the low-power alert sensor comprising at least two differing types of sensors capable of sensing different properties of the environment.

10. The method of claim 1, the low-power alert sensor being powered by at least one of electromagnetic fields, a mechanical energy source, or an acoustic energy source in the environment.

11. The method of claim 1, updating the record of the capabilities of the sensors in the sensor array responsive to the alert from the low-power alert sensor further comprising:
   responsive to the alert from the low-power alert sensor, querying the incoming sensor for registration information about the incoming sensor;
   responsive to querying the incoming sensor, receiving the registration information from the incoming sensor, the registration information including information describing the capabilities of the incoming sensor, the information describing the capabilities of the incoming sensor specifies the sensing function performed by the incoming sensor; and updating the record of the capabilities of the sensors in the sensor array to reflect the addition of the capabilities of the incoming sensor.

12. The method of claim 1, further comprising:
receiving a differing alert from the low-power alert sensor, the differing alert specifies that an outgoing sensor in the sensor array is detected by the low-power alert sensor to be withdrawing from the sensor array; and
responsive to the differing alert from the low-power alert sensor, updating the record of the capabilities of the sensors in the sensor array to reflect a loss of capabilities of the outgoing sensor.

13. An aggregation framework system, comprising:
a sensor array comprising sensors capable of sensing properties in an environment, the sensors in the sensor array comprise a plurality of different types of sensors;
a low-power alert sensor that detects an incoming sensor joining the sensor array, the low-power alert sensor generates an alert that specifies the incoming sensor is detected to be joining the sensor array;
a registration module that registers the incoming sensor responsive to the alert from the low-power alert sensor, the registration module updates a record of capabilities of the sensors in the sensor array to reflect an addition of capabilities of the incoming sensor, the capabilities of the incoming sensor being described by the incoming sensor and specifying a sensing function performed by the incoming sensor;
the low-power alert sensor further detects a change in the environment while the sensors in the sensor array are in a power-conservation state; and
a data aggregator module that:
  receives an output from the low-power alert sensor indicative of the change;
  selects a sensor in the sensor array to awaken from the power-conservation state based on:
    the change in the environment detected by the low-power alert sensor; and
    the record of the capabilities of the sensors in the sensor array;
  responsive to selection of the sensor, awakens the sensor in the sensor array;
  receives data from the sensor in the sensor array woken from the power-conservation state; and
  aggregates the data into aggregated data.

14. The aggregation framework system of claim 13, the registration module queries the incoming sensor to obtain registration information, the registration information comprising information about inherent capabilities, calibration data, power consumption, and security of the incoming sensor, wherein the information about the inherent capabilities specifies the sensing function performed by the incoming sensor.

15. The aggregation framework system of claim 13, further comprising an interpreter module that determines a course of action based on an interpretation of the aggregated data and causes the course of action to be implemented.

16. The aggregation framework system of claim 13, the data aggregator module collects data from the different types of sensors via an application programming interface.

17. A low-power alert sensor, comprising:
a microcontroller configured to execute commands that, when executed by the microcontroller, cause the microcontroller to perform acts comprising:
  monitoring an environment while sensors in a sensor array in the environment are in a power-conservation state, the sensors in the sensor array are registered to be controlled by an aggregation framework system;
  detecting an incoming sensor joining the sensor array to be controlled by the aggregation framework system;
  transmitting an alert that specifies that the incoming sensor is joining the sensor array to be controlled by the aggregation framework system;
  detecting a change in the environment; and
  transmitting an output indicative of the change in the environment, the output causes a sensor in the sensor array to be awakened from the power-conservation state based on:
    the change in the environment; and
    collective inherent capabilities of the sensors in the sensor array registered to be controlled by the aggregation framework system.

18. The low-power alert sensor of claim 17, wherein the commands, when executed by the microcontroller, further cause the microcontroller to perform acts comprising:
  detecting an outgoing sensor that is withdrawing from the sensor array, the outgoing sensor no longer being controlled by the aggregation framework system responsive to withdrawal; and
  transmitting an alert that specifies that the outgoing sensor is withdrawing from the sensor array.

19. The low-power alert sensor of claim 17 being powered by a mechanical energy source in the environment.

20. The low-power alert sensor of claim 17 being power by an acoustic energy source in the environment.

* * * * *